United States Patent [19]

Ohshita

[11] Patent Number: 5,061,054
[45] Date of Patent: Oct. 29, 1991

[54] KEPLERIAN FINDER OPTICAL SYSTEM
[75] Inventor: Koichi Ohshita, Kawasaki, Japan
[73] Assignee: Nikon Corporation, Tokyo, Japan
[21] Appl. No.: 319,293
[22] Filed: Mar. 6, 1989

[30] Foreign Application Priority Data

Mar. 15, 1988 [JP] Japan ................................ 63-60919

[51] Int. Cl.$^5$ ........................ G02B 23/00; G02B 9/08; G02B 5/04
[52] U.S. Cl. ................................ 359/399; 359/740; 359/432; 359/834; 359/376
[58] Field of Search ................................ 350/500-506, 350/145, 170, 1.2, 6.6, 423, 530-547, 507-527, 286-287, 448-450, 570, 573; 250/504 R; 351/205-208, 219-221; 354/459, 432, 409, 173.1, 476-478, 225, 199, 106, 155

[56] References Cited

U.S. PATENT DOCUMENTS

| | | | |
|---|---|---|---|
| 3,468,598 | 9/1969 | Ito | 350/573 |
| 3,558,212 | 1/1971 | Ritchie | 350/539 |
| 3,751,136 | 8/1973 | Kirchhoff | 350/173 |
| 3,788,727 | 1/1974 | Abe | 350/516 |
| 4,009,930 | 3/1977 | Abe et al. | 350/516 |
| 4,119,982 | 10/1978 | Imura et al. | 354/155 |
| 4,309,093 | 1/1982 | Kuwayama et al. | 354/155 |
| 4,643,541 | 2/1987 | Matsubara | 350/145 |
| 4,673,262 | 6/1987 | Tsui | 350/538 |
| 4,726,667 | 2/1988 | Tachihara | 350/423 |
| 4,826,302 | 5/1989 | Afsenius | 350/145 |
| 4,838,672 | 6/1989 | Oonishi | 350/537 |
| 4,842,395 | 6/1989 | Sato et al. | 350/556 |

FOREIGN PATENT DOCUMENTS

| | | | |
|---|---|---|---|
| 1387614 | 3/1975 | United Kingdom | 350/515 |
| 8300067 | 1/1983 | World Int. Prop. O. | 350/537 |

OTHER PUBLICATIONS

Fincham et al., Optics, Ninth Edition, University Press, Cambridge, 1980, Chapter 3, Section 3.9, pp. 31-32.

Primary Examiner—Bruce Y. Arnold
Assistant Examiner—Thong Nguyen
Attorney, Agent, or Firm—Shapiro and Shapiro

[57] ABSTRACT

A Keplerian finder optical system composed of, in succession from the object side, an objective lens of a positive refractive power, a field lens of a positive refractive power positioned in the vicinity of the focal plane of the objective lens, and an eyepiece lens for observing an image of the object formed on the focal plane of the objective lens, comprises a field diaphragm positioned in the vicinity of the focal plane of the objective lens, a first reflecting device with two reflecting faces positioned in the optical path between the objective lens and the field diaphragm, and second reflecting device with two other reflecting faces, positioned between the field diaphragm and the eyepiece lens.

13 Claims, 2 Drawing Sheets

KEPLERIAN FINDER OPTICAL SYSTEM

BACKGROUND OF THE INVENTION

1. Field of the Invention

The present invention relates to a finder optical system for use in a still camera, a video camera or the like, and more particularly to a Keplerian finder optical system which is compact in size and has a wide viewing field.

2. Related Background Art

Image viewing apparatus employing Keplerian optical system are already well known, as represented by telescopes. In such Keplerian telescope optical systems, there are employed various structures for obtaining an erect observed image, and there are principally known the following four structures as the erect image optical system:

(1) a system including an erecting prism on the optical path between the objective lens and the focal position thereof, as in prism binoculars;

(2) a system in which an inverted image on the focal plane of the objective lens is reformed as an erect image by a relay lens, as employed in ground telescopes;

(3) a system including a mirror between the objective lens and the focal plane thereof, and a pentagonal roof prism between said focal plane and the eyepiece, as in the finder system of single-lens reflex cameras; and (4) a system including an erecting prism between the focal plane of the objective lens and the eyepiece.

However, the above-mentioned system (1) requires a considerably long focal length for the objective lens, so that it is difficult to obtain a wide viewing field with a relatively low image magnification, as required in the finder system. The system (2) is disadvantageous for obtaining a compact finder system, particularly a finder to be incorporated in a compact camera, because the entire length of the system is large due to the presence of the relay lens. The system (3) can provide a shortest length, but it involves difficulties in the manufacture, as the pentagonal roof prism, requiring extremely precise working, is indispensable. Also the system (4) is disadvantageous for obtaining a wide viewing field required for the finder, because the erecting prism positioned immediately in front of the eyepiece limits the apparent viewing field thereof.

SUMMARY OF THE INVENTION

In consideration of the foregoing, an object of the present invention is to provide a Keplerian finder optical system of a compact and simple structure, providing an erect image and providing a wide viewing field.

The above-mentioned object can be achieved, according to the present invention, by a Keplerian finder optical system basically composed, in succession from the object side, of an objective lens of a positive retractive power, a field lens of a positive refractive power positioned in the vicinity of the focal plane of said objective lens, and an eyepiece lens for observing an image of the object formed on the focal plane of said objective lens, said Keplerian finder optical system also comprising a field diaphragm positioned in the vicinity of the focal plane of the objective lens, first reflecting means with two reflecting faces positioned in the optical path between said objective lens and said field diaphragm, and second reflecting means with two other reflecting faces, positioned between said field diaphrag,m and said eyepiece lens.

In the above-described structure, among four reflecting faces required for obtaining an erect image in the Keplerian finder optical system, two are positioned between the objective lens and the field diaphragm on the focal plane while the remaining two are positioned between the field diaphragm and the eyepiece lens. Such suitable distribution of the reflecting faces on both sides of the field diaphragm where a spatial image is formed achieves effective utilization of the space between the objective lens and the eyepiece lens in obtaining the erect image. Also each of the optical paths at the objective lens side and the eyepiece side on both sides of the focal plane, where the spatial image is formed, need not be particularly long but only long enough for accommodating two reflecting faces, so that the apparent viewing field of the eyepiece lens can be maintained suitably wide.

In a finder for a camera with a relatively low image magnificarion of about 0.4 to 2.0 system of the finder is approximately symmetrical with respect to the field diaphragm, where the spatial image is formed, if the ratio of the focal lengths of the objective lens and the eyepiece lens is about in the above-mentioned range. Consequently, the system of the present invention, in which the reflecting faces for obtaining an erect image are distributed approximately symmetrically with respect to the field diaphragm. is particularly adequate for compactness of the finder, within the above-mentioned range of image magnification.

The foregoing and other objects of the present invention, and the advantages thereof, will become fully apparent from the following description, to be taken in conjunction with the attached drawings.

DESCRIPTION OF THE PREFERRED EMBODIMENTS

Now the present invention will be clarified in detail by embodiments thereof shown in the attached drawing.

Figure 1:
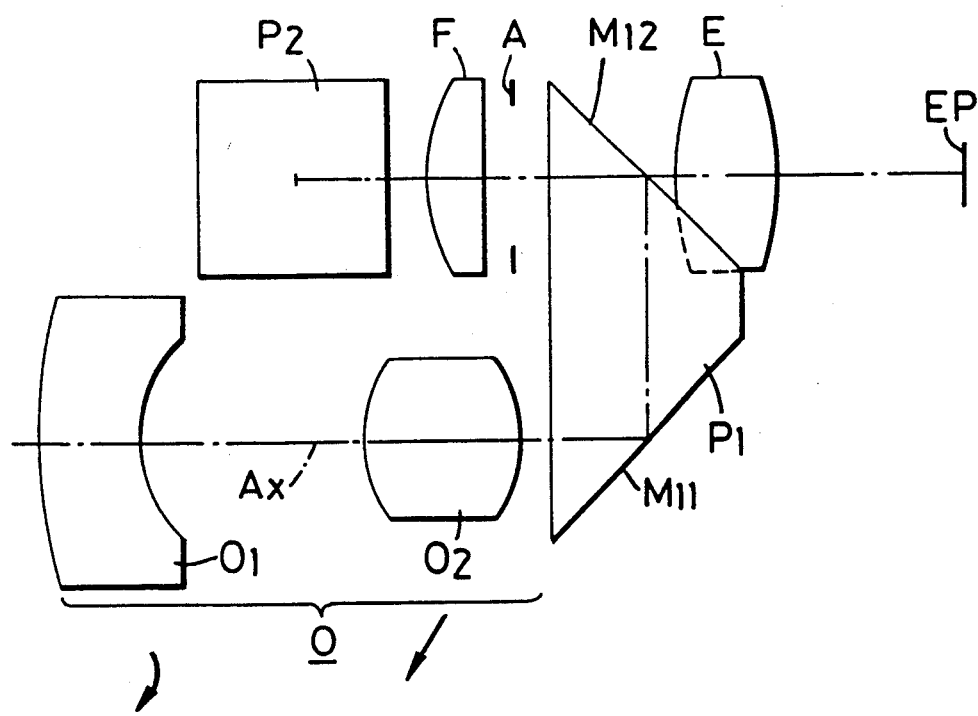
FIG. 1 is a lateral view of an optical system constituting a first embodiment of the present invention.
Figure 2:
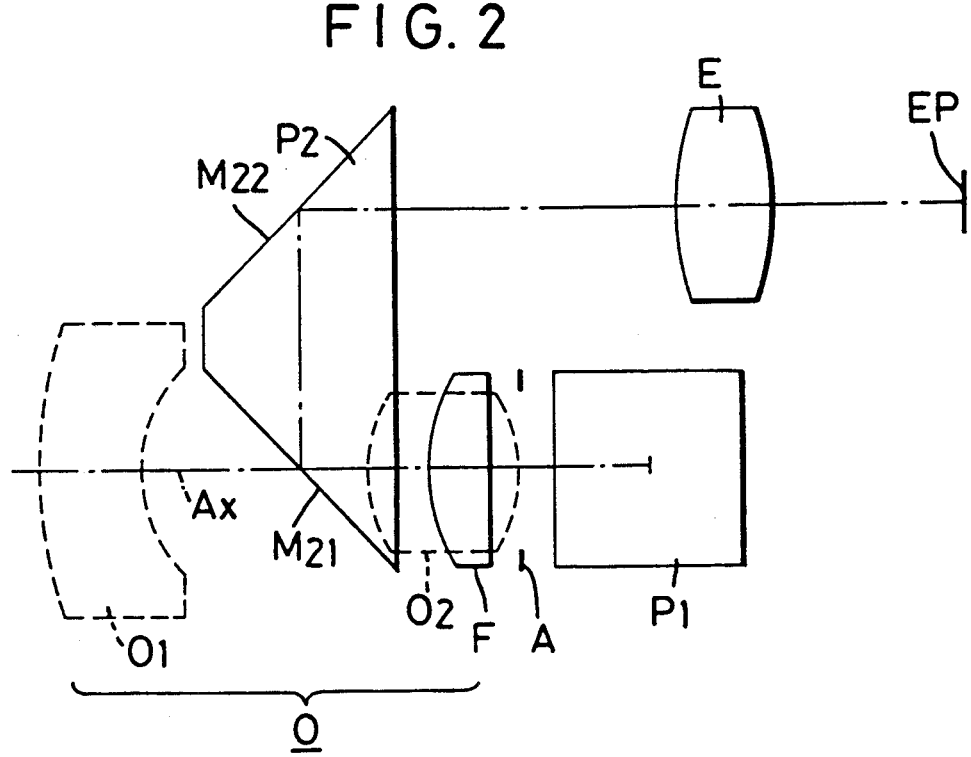
FIG. 2 is a plan view of the optical system of the first embodiment shown in FIG. 1.

Referring to FIGS. 1 and 2 showing a first embodiment of the present invention respectively in a lateral view and a plan view, an objective lens O is a zoom lens composed of a front lens unit $O_1$ of a negative refractive power and a rear group unit $O_2$ of a positive refractive power the lens units being mutually movable along the optical axis Ax, as indicated by the arrows in FIG. 1. The light transmitted by the objective lens O is reflected by mutually orthogonal first and second reflecting faces $M_{11}$, $M_{12}$ of the first reflecting means $P_1$, composed of a rectangular prism, and is focused on a field diaphragm A positioned on the focal plane of the objective lens O, thereby forming an image of the object. The light, converging on the field diaphragm A and forming the object image thereon, diverges thereafter and passes through a field lens F positioned close to the field diaphragm, and then enters second reflecting means $P_2$ composed of a rectangular prism. The second reflecting means $P_2$ is provided with mutually orthogonal reflecting faces $M_{21}$, $M_{22}$ as in the first reflecting means $P_1$, and the light reflected by the reflecting faces enters an eyepiece lens E so positioned that the front focal point thereof falls on the focal plane of the objective lens O, whereby the light is converted into a substantially parallel beam. The parallel beam enters an observing eye, at an eye point EP.

Incident planes (a plane, including the optical axis Ax and a line normal to a reflecting face at the optical axis Ax) of the first and second reflecting faces $M_{11}$, $M_{12}$ of the first reflecting means $P_1$ lie in a common plane, and the incident planes of the first and second reflecting faces $M_{21}$, $M_{22}$ of the second reflecting means $P_2$ also lie in common plane. The incident plane of the first reflecting means $P_1$, parallel to the plane of FIG. 1, is perpendicular to the incident plane of the second reflecting means $P_2$, parallel to the plane of FIG. 2, whereby the first reflecting means $P_1$ inverts the object image in the vertical direction, while the second reflecting means $P_2$ inverts the object image in the lateral direction. Thus the image, inverted in the vertical and lateral direction, formed by the objective lens O, is inverted into an erect and normal image by the first and second reflecting means $P_1$ $P_2$, whereby an erect image can be observed through the eyepiece lens E.

The mutually orthogonal reflecting faces of each reflecting means need not necessarily be composed of internal reflecting faces of a prism as explained in the foregoing embodiment, but can naturally be replaced by surface reflecting mirrors.

In the foregoing embodiment, the objective lens O is a zoom lens composed of a negative lens unit $O_1$ a positive lens unit $O_2$, but a change in the magnification of the finder image can also be achieved in the eyepiece lens E. However, the use of a zoom lens composed of a negative front lens unit $O_1$ and a positive rear lens unit $O_2$ as the objective lens not only simplifies the lens structure but also reduces the change in the total length of the objective lens. The zoom lens of such structure generally has a long back focal length, but such long back focal length can be effectively utilized by the structure of the present invention, in which two reflecting faces for erecting the image are provided between the objective lens and the image point thereof. Also the position of the eye point EP can be effectively maintained constant by fixing the position of the exit pupil regardless of the change in the image magnification, as in a zoom lens with so-called behind-diaphragm.

Figure 3:
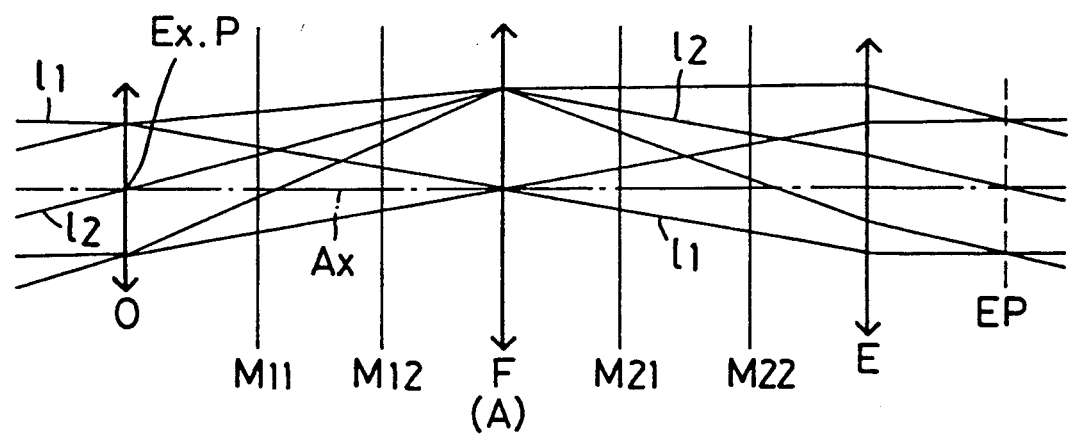
FIG. 3 is a developed view in which the optical path of the finder optical system of the present invention is linearly extended.

FIG. 3 is an optical path chart in which the optical path of the above-explained first embodiment is linearly extended. The objective lens O, field lens F and eyepiece lens E are represented as thin lenses, and the reflecting faces $M_{11}$, $M_{12}$, $M_{21}$ and $M_{22}$ are represented by straight lines. A ray $l_1$ entering the objective lens O parallel to the optical axis Ax with a predetermined height therefrom (so-called rand or marginal ray) crosses the optical axis Ax on the field lens F positioned close to the field diaphragm A, and becomes substantially parallel to the optical axis Ax again when emerging from the eyepiece lens E. Thus the rand ray $l_1$ is not affected by the field lens F, if it is positioned close to the focal plane of the objective lens O. On the other hand, an off-axis ray $l_2$ is refracted by the field lens F toward the optical axis, then passes through the eyepiece lens E and crosses the optical axis at the eye point EP. In this manner the field lens F, cooperates with the eyepiece lens E, to establish a conjugate relationship between the exit pupil $E_{x,P}$ of the objective lens O and the eye point EP. It is therefore possible to place the eye point EP at a suitable position in the finder optical system, and to reduce the diameter of the lenses and the reflecting faces, thereby making the entire finder system compact.

Figure 4:
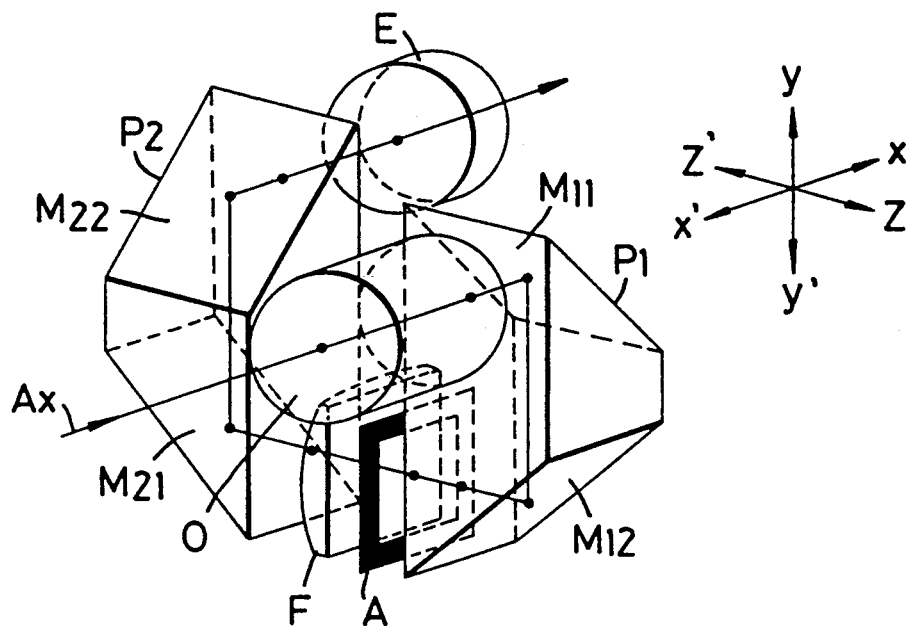
FIG. 4 is a perspective view of a second embodiment of the present invention.

FIG. 4 is a perspective view of a second embodiment of the present invention, where equivalent components to those in the foregoing first embodiment are represented by the same symbols.

Referring to FIG. 4, the light from an object (not shown) is transmitted by the objective lens O, reflected downwards by the first reflecting face $M_{11}$ of the first reflecting means $P_1$, then reflected laterally by the second reflecting face $M_{12}$ of the first reflecting means $P_1$ and is focused on a field diaphragm A positioned on the focal plane of the objective lens O, thereby forming an image of the object. The light from the object image is converged by the field lens F, then reflected upwards by the first reflecting face $M_{21}$ of the second reflecting means $P_2$, further reflected by the second reflecting face $M_{22}$ of the reflecting means $P_2$ and enters the eyepiece lens so positioned that the focal point thereof falls on the focal plane of the objective lens O, thereby being converted into a substantially parallel beam.

In the above-explained structure, the reflecting faces are positioned as follows, with reference to the x-axis parallel to the optical axis, y-axis in the vertical direction and z-axis in the horizontal direction. In the first reflecting means $P_1$, the incident plane, parallel to the x-y plane, of the first reflecting face $M_{11}$ is perpendicular to the incident plane, parallel to the y-z plane, of second reflecting face $M_{12}$. Also in the second reflecting means $P_2$, the incident plane, parallel to the y-z plane, of the first reflecting face $M_{21}$ is perpendicular to the incident plane, parallel to the x-y plane, of the second reflecting face $M_{22}$. On the other hand, the incident plane of the second reflecting face $M_{12}$ of the first reflecting means $P_1$ and that of the first reflecting face $M_{21}$ of the second reflecting means $P_2$ lie in a common plane.

Consequently, in the present second embodiment, the inverted image formed by the objective lens O on the field diaphragm A is rotated by 90° about the optical axis by means of the first reflecting means $P_1$, and further rotated by 90° into an erect image by means of the second reflecting means $P_2$, so that an erect image can be observed through the eyepiece lens E. The second embodiment shown in FIG. 4 is different from the first embodiment shown in FIG. 1 in that one of two reflecting faces in each of the first and second reflecting means $P_1$, $P_2$ is rotated by 90° about the optical axis. In the finder optical system shown in FIG. 4, two reflecting means $P_1$, $P_2$ are positioned laterally, from which the objective lens O protrudes toward the object while the eyepiece lens E protrudes towards the observing eye. It may thus be thicker than the first embodiment shown in FIG. 1, but the optical axis of the objective lens can be positioned on the same horizontal plane as that of the eyepiece lens E.

Also in the first embodiment shown in FIG. 1, the eyepiece lens E has to be positioned behind the first reflecting means $P_1$, in order to place the eye point E in an appropriate position where the observation of the finder is not hindered by the first reflecting means $P_1$. Consequently the distance between the eyepiece lens E and the second reflecting means $P_2$ has to be selected relatively large, and this fact is disadvantageous for increasing the magnification of the eyepiece lens E. On the other hand, in the second embodiment shown in FIG. 4, the distance between the second reflecting means $P_2$ and the eyepiece lens E can be made smaller. It is therefore possible to increase the image magnification by reducing the distance between the field diaphragm A and the eyepiece lens E and increasing the refractive power of the eyepiece lens E. Also in the second embodiment, the reflecting faces of the reflecting means may be composed of rectangular prisms or surface reflecting mirrors.

As explained in the foregoing, the present invention can provide a Keplerian finder optical system for use in a camera, providing an erect image of a relatively wide viewing field, with a compact and simple structure. Also since the reflecting faces are positioned approximately symmetrically on both sides of the object image formed by the objective lens the present invention is most advantageous for compactness of the finder system in case the focal length of the objective lens is approximately equal to that of the eyepiece lens, namely in case the image magnification of the finder system is close to unity.

What is claimed is:

1. A Keplerian finder optical system providing a wide viewing field with a compact structure, comprising:
   image forming lens means of a positive refractive power for forming an inverted image of an object;
   a field diaphragm provided in the vicinity of the focal plane of said image forming lens means, for defining the viewing field of the finder optical system;
   a field lens provided in the vicinity of said field diaphragm;
   an eyepiece lens for observing the object image formed on the focal plane of said image forming lens means; and
   an erect image optical system comprising first reflecting means provided with first and second reflecting faces between said image forming lens means and said field diaphragm for guiding the light from said image forming lens means to said field diaphragm, and second reflecting means provided with third and fourth reflecting faces between said field diaphragm and said eyepiece lens for guiding the light transmitted by said field diaphragm and said field lens to said eyepiece lens, said first and second reflecting means being disposed so as to erect said inverted object image formed by said image forming lens means.

2. A Keplerian finder optical system according to claim 1, wherein the incident planes to the first and second reflecting faces of said first reflecting means lie in a common plane, the incident planes to the third and fourth reflecting faces of said second reflecting means lie in a common plane, said incident planes of said first reflecting means are perpendicular to those of said second reflecting means, and said field diaphragm and said field lens are positioned on an optical path between said second and third reflecting faces.

3. A Keplerian finder optical system according to claim 1, wherein said first and second reflecting means are composed of two rectangular prisms, wherein said first and second reflecting faces are mutually perpendicular, said third and fourth reflecting faces are mutually perpendicular and, the incident plane to said first and second reflecting faces is perepndicular to that to said third and fourth reflecting faces, and wherein said field diaphragm and said field lens are positioned on an optical path between said two rectangular prisms.

4. A Keplerian finder optical system according to claim 1, wherein the incident plane to said first reflecting face of said first reflecting means is perpendicular to that to said second reflecting face thereof, the incident plane to said third reflecting face of said second reflecting means is perpendicular to that to said fourth reflecting face thereof, the incident plane to said first reflecting face is parallel to that to said fourth reflecting face, and the incident planes to said second and third reflecting faces lie in a common plane, and wherein said field diaphragm and said field lens are positioned on an optical path between said second and third reflecting faces.

5. A Keplerian finder optical system according to claim 1, wherein said erect image optical system is composed of two rectangular prisms the incident planes to said first and second reflecting faces of said first reflecting means are mutually perpendicular, and the incident planes to said third and fourth reflecting faces of said second reflecting means are mutually perpendicular, and wherein said field diaphragm and said field lens are positioned on an optical path between said two rectangular prisms.

6. A Keplerian finder optical system according to claim 1, wherein said image forming lens means is a zoom lens, composed of a front lens unit with a negative refractive power and a rear lens unit of a positive refractive power, which are mutually movable along an optical axis.

7. A Keplerian finder optical system according to claim 1, wherein said first and fourth reflecting faces are disposed at location substantially symmetrically with respect to said field diaphragm and said second and third reflecting faces are disposed at location substantially symmetrically with respect to said field diaphragm.

8. A Keplerian finder optical system providing a wide viewing field with a compact structure, comprising:
   image forming lens means of a positive refractive power for forming an inverted image of an object;
   a field diaphragm provided in the vicinity of the focal plane of said image forming lens means, for defining the viewing field of the finder optical system;
   a field lens provided in the vicinity of said field diaphragm;
   an eyepiece lens for observing the object image formed on the focal plane of said image forming lens means; and
   an erect image optical system comprising first reflecting means provided with first and second reflecting faces between said image forming lens means and said field diaphragm for guiding the light from said image forming lens means to said field diaphragm, and second reflecting means provided with third and fourth reflecting faces between said field diaphragm and said eyepiece lens for guiding the light transmitted by said field diaphragm and said field lens to said eyepiece lens, thereby erecting said inverted object image formed by said image forming lens means;
   wherein said first and fourth reflecting faces are disposed at locations substantially symmetrically with respect to said field diaphragm and said second and third reflecting faces are disposed at locations substantially symmetrically with respect to said field diaphragm, and wherein the entire Keplerian finder optical system has an image magnification of about 0.4 to 2.0 and the focal length of the image forming lens means is approximately equal to that of the eyepiece lens.

9. A Keplerian finder optical system according to claim 7, wherein the image forming lens means has an exit pupil and the eyepiece lens has an eye point that are conjugate with respect to the field lens.

10. A Keplerian finder optical system according to claim 7, wherein an optical path between said first and second reflecting faces and an optical path between said third and fourth reflecting faces are straight paths on which no lenses are present.

11. A Keplerian finder optical system providing a wide viewing field with a compact structure, comprising:
    image forming lens means of a positive refractive power for forming an inverted image of an object;
    a field diaphragm provided in the vicinity of the focal plane of said image forming lens means, for defining the viewing field of the finder optical system;
    a field lens provided in the vicinity of said field diaphragm;
    an eyepiece lens for observing the object image formed on the focal plane of said image forming lens means, said eyepiece lens having a focal length approximately equal to that of said image forming lens means; and
    an erect image optical system comprising first reflecting means provided with first and second reflecting faces between said image forming lens means and said field diaphragm for guiding the light from said image forming lens means to said field diaphragm, and second reflecting means provided with third and fourth reflecting faces between said field diaphragm and said eyepiece lens for guiding the light transmitted by said field diaphragm and said field lens to said eyepiece lens, said first and second reflecting means being disposed so as to erect said inverted object image formed by said image forming lens means.

12. A Keplerian finder optical system providing a wide viewing field with a compact structure, comprising:
    image forming lens means having a predetermined focal length for forming an inverted image of an object;
    a field diaphragm provided in the vicinity of the focal plane of said image forming lens means, for defining the viewing field of the finder optical system;
    a field lens provided in the vicinity of said field diaphragm;
    an eyepiece lens having a predetermined focal length for observing the object image formed on the focal plane of said image forming lens means, the ratio of the focal lengths of the image forming lens means and eyepiece lens being about 0.4 to 2.0; and
    an erect image optical system comprising first reflecting means provided with first and second reflecting faces between said image forming lens means and said field diaphragm for guiding the light from said image forming lens means to said field diaphragm, and second reflecting means provided with third and fourth reflecting faces between said field diaphragm and said eyepiece lens for guiding the light transmitted by said field diaphragm and said field lens to said eyepiece lens, said first and second reflecting means being disposed so as to erect said inverted object image formed by said image forming lens means, said first and fourth reflecting faces being disposed at locations substantially symmetrically with respect to said field diaphragm and said second and third reflecting faces being disposed at locations substantially symmetrically with respect to said field diaphragm.

13. A Keplerian finder optical system according to claim 12, wherein said image forming lens means has a zoom lens composed of a negative front lens unit and a positive rear lens unit.

* * * * *